United States Patent Office 3,560,152
Patented Feb. 2, 1971

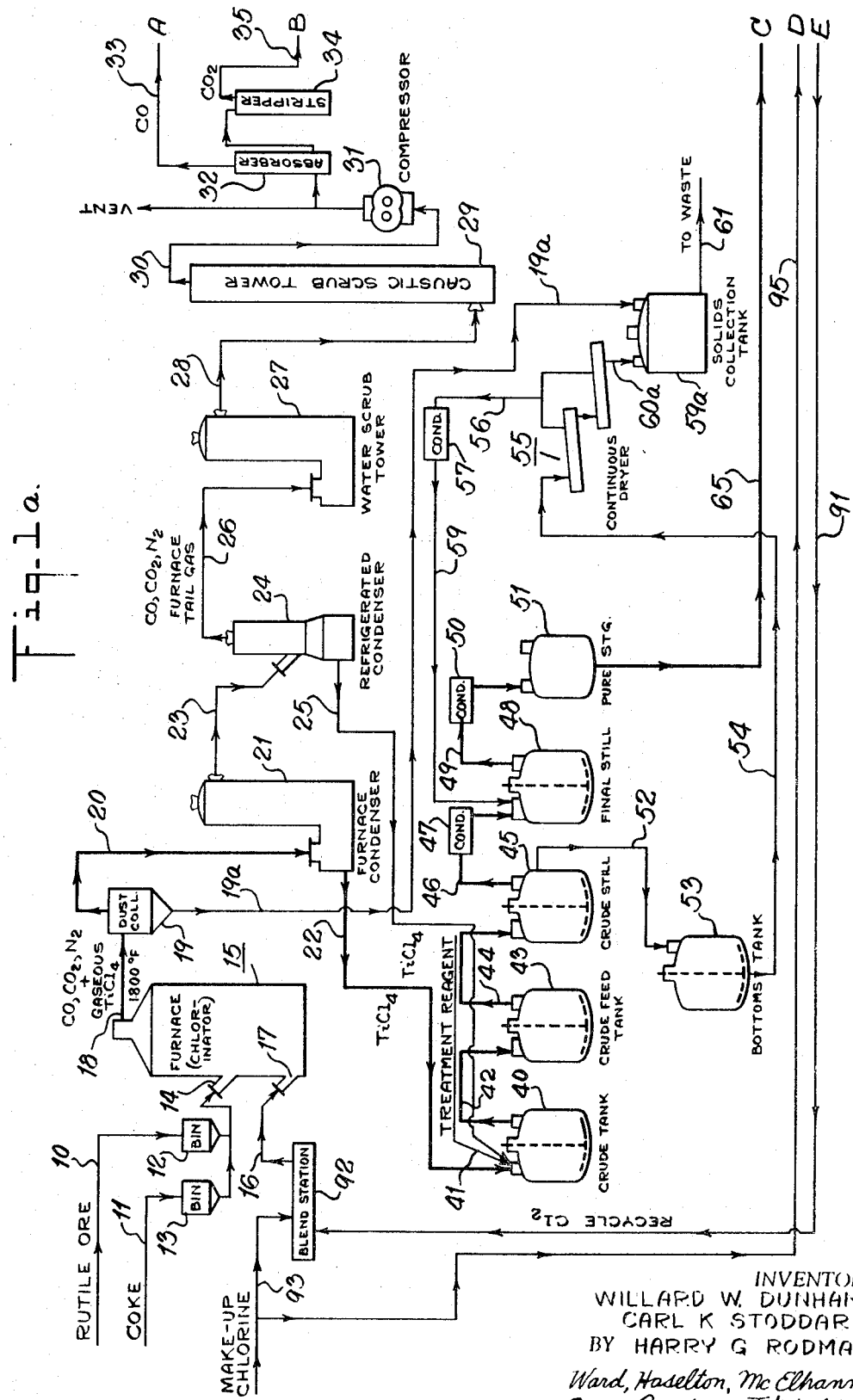

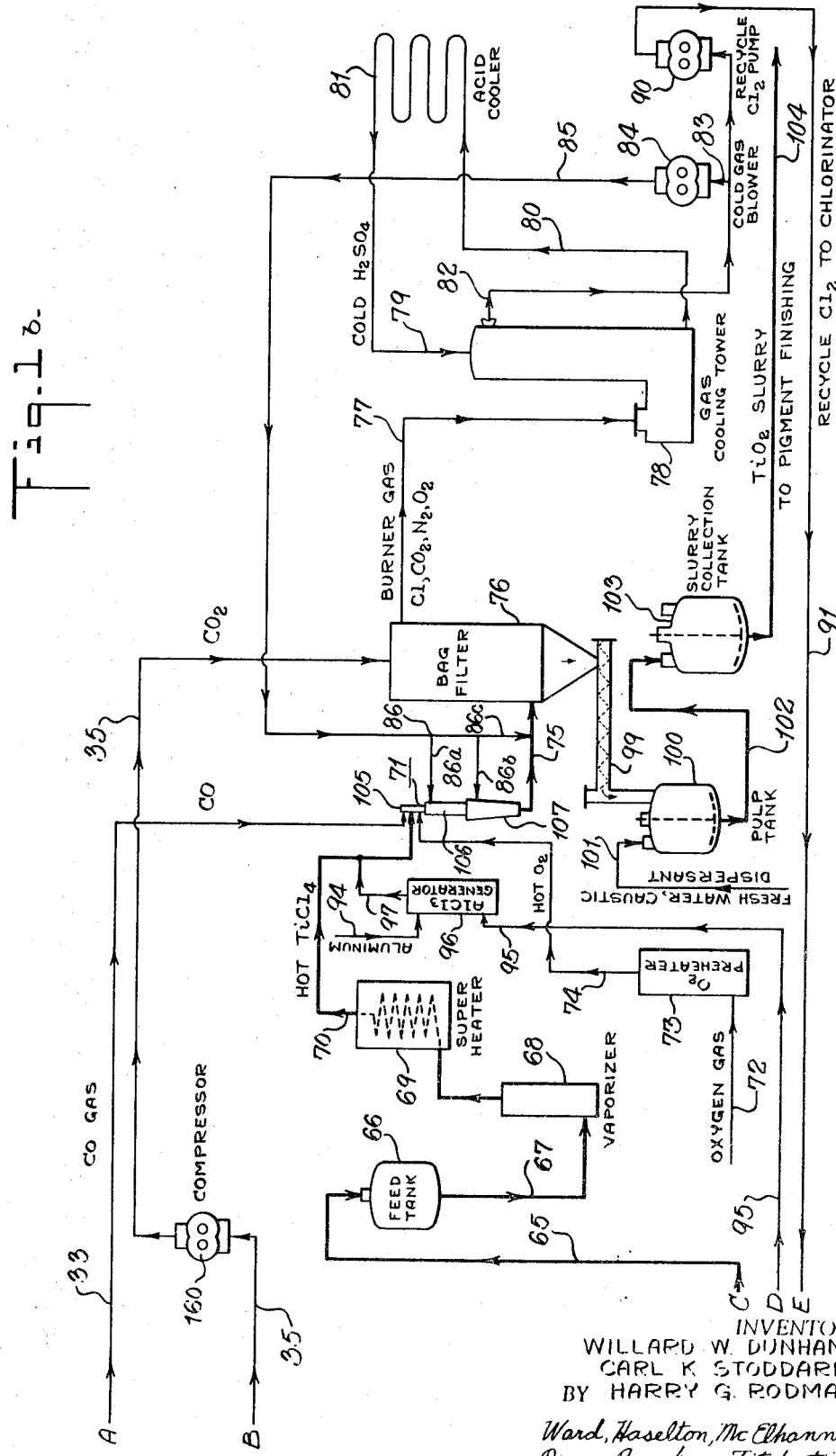

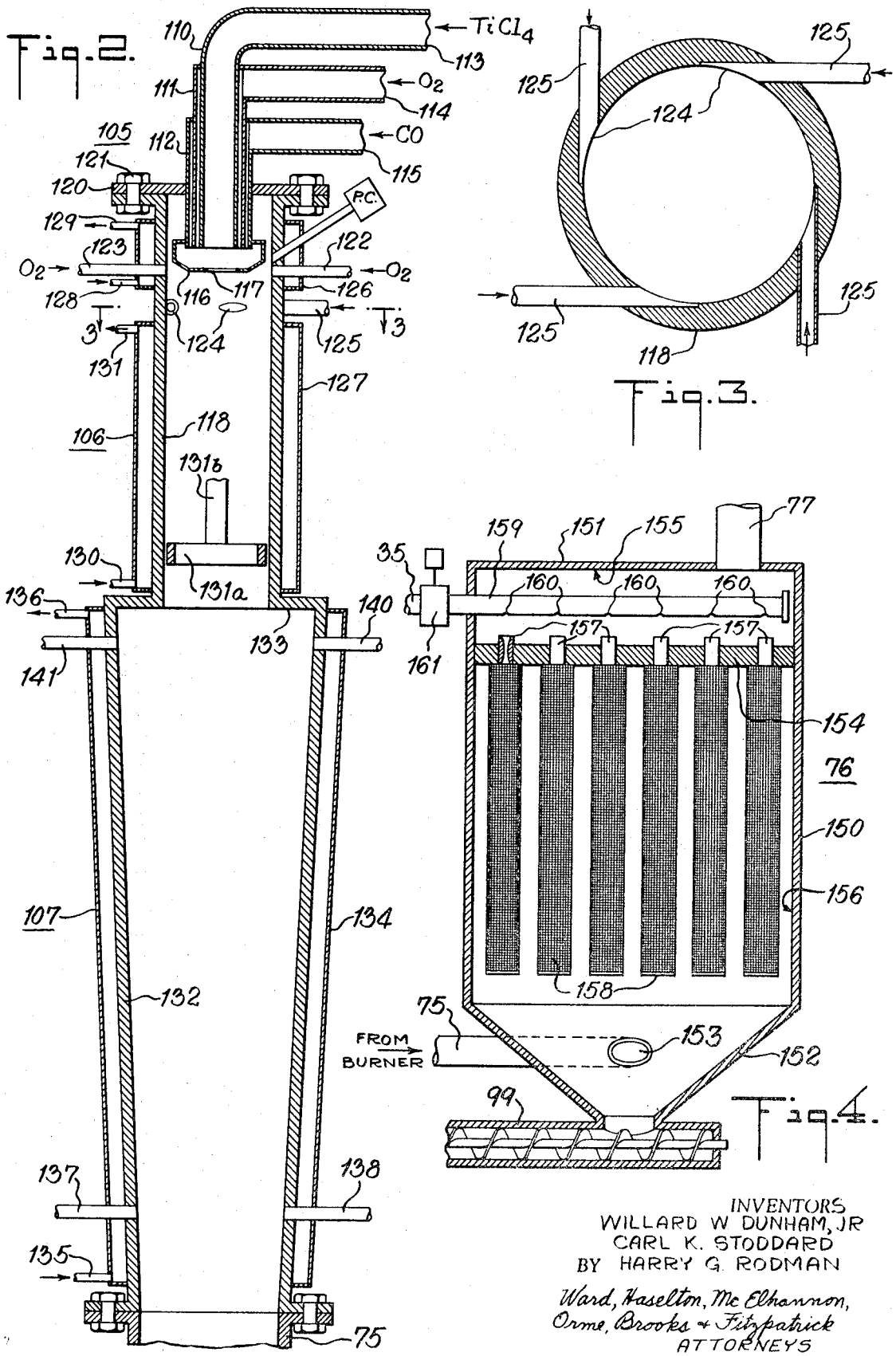

3,560,152
VAPOR PHASE PRODUCTION OF TITANIUM DIOXIDE PIGMENTS
Willard W. Dunham, Jr., and Carl K. Stoddard, Westfield, and Harry G. Rodman, New Shrewsbury, N.J., assignors to National Lead Company, New York, N.Y., a corporation of New Jersey
Filed Nov. 26, 1965, Ser. No. 509,999
Int. Cl. C01g 23/04
U.S. Cl. 23—202                   19 Claims

ABSTRACT OF THE DISCLOSURE

Process and apparatus for the vapor phase production of titanium pigments as a continuous operation, starting with titanium bearing raw materials, such as titanium ore, including conversion thereof to $TiCl_4$ by chlorinating in the presence of a solid carbonaceous reductant at elevated temperature with evolution of said $TiCl_4$ in admixture with CO, $CO_2$ and other gaseous and solid constituents, followed by separation of the solids, separation of the $TiCl_4$ from other gaseous constituents and purification thereof, purification of the remaining gaseous constituents to remove therefrom constituents other than carbon dioxide and carbon monoxide, separating these two to produce a purified carbon monoxide, thereupon continuously reacting the purified $TiCl_4$ in a vaporized state in a closed reaction chamber with a free oxygen containing gas at elevated temperature maintained by burning said carbon monoxide with a portion of said oxygen to form titanium dioxide particles and chlorine containing gas, and continuously discharging said reaction products from the reaction chamber and separating the solids content from said chlorine containing gas and recycling the solids-free chlorine containing gas for reaction with additional said carbonaceous reductant and titanium raw material.

---

This invention pertains to the pyrogenic production of titanium dioxide pigments by the vapor phase reaction of titanium tetrachloride with oxygen at elevated temperature and provides a novel and improved process for such production.

The invention in its essentials provides a continuous and cyclic process for producing a titanium dioxide pigment of high tinting strength and good particle size starting with a titanium-bearing material, such as a titaniferous concentrate, or a titanium ore low in iron, such as a rutile ore, the titanium values of which are converted to the tetrachloride by elevated temperature reaction with chlorine in a chlorinator in the presence of a carbonaceous reductant with accompanying production of carbon monoxide and carbon dioxide-containing gases, at least a portion of which CO gas is combusted in a reaction chamber or burner in the presence of the tetrachloride and oxygen or a free oxygen-containing gas to provide a portion of the requisite heat and temperature for reacting the tetrachloride with oxygen therein, thus to produce a titanium dioxide pigment with accompanying production of chlorine-containing gas, all of which is sent to the chlorinator for chlorination of the ore on a continuous basis, the gas flow from the burner to the chlorinator including a closed, constant pressure loop or gas recycle which, on appropriate cooling, may be employed (1) as non-reacting scavenging gases in the reaction chamber to prevent adherence of the pigment particles as formed to the reaction chamber walls, and (2) as non-reacting coolant gases for imparting controlled cooling to the pigment-burdened gases exiting from the reaction zone, such as to inhibit grain growth of the pigment particles while assuring completion of the oxidation reactants and such as to produce a titanium dioxide pigment high in rutile content, while the $CO_2$ gas from the chlorinator is employed for auxiliary purposes as discussed below.

Objects of the invention are: to provide a process for producing titanium dioxide pigment from titanium-bearing materials, wherein the process is continuous from the ore chlorination stage to the pigment end product; also wherein gaseous products resulting from the reactions involved, such as chlorine, carbon monoxide and carbon dioxide are recycled and utilized in the process for accomplishing the various ancillary ends above and hereinafter stated; and wherein the end products of the process comprise titanium dioxide pigments of desired particle sizes and tinting strengths, and rutile pigments of low anatase content so characterized.

A novel feature of the process of the invention of outstanding importance, resides in so correlating the operation of the chlorinator and burner units that the chlorinator provides on a continuous basis at least the requisite amount of CO gas in relation to the amount of $TiCl_4$ generated, such that on combustion of the CO in the burner the combustion zone is maintained at the proper operating temperature; while concurrently the burner is so operated normally that the chlorine-containing off-gases from the burner are of an appropriate composition as to chlorine and other gaseous constituents as to be sent to the chlorinator in the manner above stated. The invention resides in part in discovery of the control factors involved in the above operation and in the manner of so correlating the same as to provide such. An additional feature of the invention lies in the cyclic operation of the chlorinator and burner units together with a secondary recycle of burner off-gases to provide for the coolant and scavenging operations above mentioned.

In accordance with another aspect of the invention, it has been discovered that if in particular the titanium tetrachloride oxidation reaction is carried out at the optimum reaction temperature, usually at something in excess of about 2400° F., and in the presence of small amounts of aluminum chloride for improving the pigment by the production of an aluminum oxide compound formed therewith, that the reactions involved being incomplete and reversible at temperatures above about 2400° F., reaction of the gases to produce the solid pigment never goes to completion in the reaction or combustion zone, so that small amounts of unreacted titanium tetrachloride and aluminum chloride are carried with the product gases into the gas collecting system wherein unreacted compounds, or their derivatives, are deposited and consequently clog filters, scrubbers, absorbers and the like. It has been further found with reference to this difficulty, that by exhausting the solids $TiO_2$-burdened product gases from the reaction zone of the combustion chamber and contacting them with a non-reactive coolant gas in a cooling chamber, to cool the gases to temperature low enough to inhibit agglomeration of the solid $TiO_2$ particles but nevertheless sufficiently high for completion of the reactions referred to, usually in the temperature range of about 1300–2000° F., and holding thereat for a short period of time, ordinarily about 0.1–5 seconds, that the unreacted metal chlorides will be fully converted to the oxidic state. Thereupon the solids $TiO_2$-burdened product gases are cooled further to temperature sufficiently low to prevent injury to the filtering equipment into which these gases are thence discharged, and the solids content separated therefrom. A portion of the solids-free gases on appropriate cooling may be recycled to provide the coolant action referred to, or alternatively some other source of coolant gas may be employed, such as $CO_2$ off-gas from the process or a mixture of $CO_2$ and $O_2$.

It has been further found that complete conversion in the cooling zone of these residual amounts of $TiCl_4$ and $AlCl_3$ into $TiO_2$ and $Al_2O_3$ may be obtained in another way by the introduction into the cooling zone of a small amount of $H_2O$ following the coolant action effected by introduction of the non-reacting coolant gas provided the temperature in the cooling zone is reduced to a value such that the $H_2O$ will not react with the chlorine gas formed to produce HCl. This reaction will not occur if the pigment-burdened product gases are cooled to at least 1300° F. before introducing the $H_2O$. The amount of $H_2O$ thus introduced should be at least the stoichiometric amount required to react with the unreacted $TiCl_4$ and $AlCl_3$ values, and should preferably be in excess thereof up to about 100% in excess.

This coolant action as conducted substantially within the temperature range above stated and in the presence of aluminum chloride, has been found to have added advantage that it facilitates carrying to substantial completion the transformation of anatase to rutile $TiO_2$ thus to provide a rutile pigment of extremely low anatase content, i.e., not exceeding about 3% and as low as 0.20% by weight.

Considering the process of the invention from still another aspect, it has further been found that the pigment particles as they are formed in the reaction zone, being of somewhat tacky nature at the reaction temperature, tend to adhere to the walls of the reaction chamber and thus build up deposits thereon, which impairs flow of the reacting gases therein and which also has a degrading effect on the quality of the pigment product produced. In addition as such deposits accumulate on the reaction chamber walls, fairly large pieces break away from time to time and fall into the fine particle size pigment, thus requiring a separate operational step for removing the same.

These defects are eliminated in accordance with a further feature of the present invention in one of its modifications, by injecting along the inner wall of the reaction chamber, a protective sheath of high velocity gas, such as to deflect the pigment particles away from the reaction chamber wall. This protective gas sheath is preferably obtained by injecting the gas into the reaction chamber at points spaced thereabout and in a direction tangential to the inner wall surface at each point of injection. To this end the inner wall of the reaction chamber is preferably made of circular, cylindrical contour, so that the so-injected gas has imparted thereto a vortex motion against the reaction chamber wall, which while deflecting the pigment particles away from the wall introduces minimum interference with the normal flow of the pigment-burdened reaction product gases longitudinally of the reaction chamber toward its discharge end.

In accordance with another modification, the accumulation of pigment deposits on the reaction chamber walls may also be prevented by periodic mechanical removal of such deposits as by means of a ring-shaped scraper element fitting inside the inner wall of the reaction chamber and having affixed thereto an actuating rod which may be power or manually reciprocated for displacing the ring longitudinally in the reaction chamber. Such mechanical scraper ring may replace or supplement the vortex gas sheath above described. In this connection the selection of scraper rings of varying O.D. is contemplated for it has been discovered that the O.D. of the ring determines the thickness of the $TiO_2$ deposit on the walls of the chamber and hence the effective I.D. of the chamber thereby producing variations in the velocity of the reaction gases in the chamber as well as heat transfer through the walls of the chamber.

The product gases from the reaction chamber are, after removal of the pigment solids and upon appropriate cooling, an excellent source of coolant gases which are inert with respect to the reactions involved and hence are preferably used therefor in the process of the invention by recycling a portion and injecting as above stated. Also since as stated the pigment particles are of a tacky consistency at the reaction temperature, but not so at substantially lower temperatures, the solids-free product gases prior to recycling are preferably cooled substantially to room temperature, preferably about 100° F., thus to cool any pigment particles traversing the vortex sheath to temperature sufficiently low as upon contacting the reaction chamber wall, not to adhere thereto.

For a more detailed description of the invention elaborating upon the above and other novel features thereof, reference will now be had to the accompanying drawings wherein:

FIGS. 1a and 1b are a flow sheet in more or less diagrammatic showing of the essential apparatus components and sequence of operations employed in the process, FIG. 1b being an extension of FIG. 1a at the designated breaking points A to E, inc.;

FIG. 2 is a view in axial sectional elevation of a preferred combustion chamber and associated burner and cooling chamber assembly for producing $TiO_2$ pigment from titanium tetrachloride by reaction with oxygen in the presence of the carbon monoxide flame; while FIG. 3 is a transverse section of FIG. 2 as taken at 3—3 thereof; and FIG. 4 is a view in vertical sectional elevation of a preferred form of filtering apparatus for separating the pigment from the pigment-burdened gases discharged from the cooling chamber of FIGS. 2 and 3.

Referring to the flow diagram of FIGS. 1a and 1b, the sequence of operations is as follows: A titanium-bearing material low in iron content, preferably rutile ore, and a carbonaceous reductant, such as coke, are charged as at 10, 11, into bins 12, 13, from which they are continuously fed, as by means of a motor-driven screw feeder, through a downwardly inclined duct 14 into an upper portion of a chlorinating furnace 15, and into which chlorine-containing gas is also continuously fed over a supply line 16, and thence into the furnace at a level of injection as at 17, disposed below that at which the ore-coke feed is introduced.

The construction and operation of the chlorinating furnace are fully described in United States Patent 3,101,249 to J. C. Priscu, incorporated by reference herein. As described in the patent, the chlorine-containing gas is injected through the furnace sidewall at points spaced thereabout and in a downwardly inclined direction from whence it flows upwardly through the ore-coke bed with velocity sufficient to maintain the bed in suspension and thus effect complete reaction throughout the same of the coke with the oxygen of the ore to form carbon dioxide $CO_2$ and carbon monoxide CO gases, and of the chlorine with the thus-liberated titanium values to form titanium tetrachloride. Other metal oxides present in the ore as impurities, as for example oxides of iron, chromium, vanadium, etc., undergo similar reactions to form chlorides thereof. The input feed rates of the reactants into the furnace, following an initial start-up as described in the patent are such as described below as to maintain a bed temperature in the furnace of about 1300–2300° F. and preferably about 1600–1800° F., such that the titanium tetrachloride formed (boiling point about 270° F.) passes off in gaseous form through the discharge line 18 at the top of the furnace along with the $CO_2$, CO and other gases as stated below, and along with the other metallic chlorides formed as well as unreacted coke and ore particles.

The feed gas to the chlorinator 15, supplied thereto over line 16, consists principally of chlorine-containing gas produced in the reaction chamber or burner as mentioned above and described below, together with a small amount of fresh make-up chlorine, the composition of this feed gas as produced in accordance with the process of the invention being typically about as follows:

TABLE I.—COMPOSITION OF FURNACE FEED GAS

| Component | Normal range | Typical |
|---|---|---|
| $CO_2$, percent | 12-32 | 28 |
| $O_2$, percent | 5-15 | 14 |
| $Cl_2$, percent | 50-65 | 53 |
| $N_2$, percent | 2-8 | 5 |

As mentioned above, the chlorination step is a dual purpose operation. It must react chlorine, coke and ore in a fluidized bed to produce sufficient quantity and quality of titanium tetrachloride to sustain pigment-producing operations. It must also produce an off-gas of sufficient quality and quantity of CO and $CO_2$ to provide for separation and recovery of these gases, and the former for pigment burner operations and the latter for auxiliary service applications as described below.

The chlorination furnace itself must provide for essentially complete utilization of the available chlorine in the feed gas in accordance with the following reactions:

(1) $TiO_2 + 2Cl_2 + C \rightarrow TiCl_4 + CO_2$ (2) $TiO_2 + 2Cl_2 + 2C \rightarrow TiCl_4 + 2CO$ (3) $2O_2 + 3C \rightarrow 2CO + CO_2$ The composition of gases fed to the furnace fixes the bed temperature, which in turn, fixes the ratio of CO to $CO_2$ in the furnace off-gas. The ore feed rate is determined by the rate of $Cl_2$ addition. The coke feed rate is determined by hte off-gas flow rate and $\phi$ ratio $$\frac{CO}{CO + CO_2}$$

with a correction factor for the dust (mostly coke) carried out of the furnace to the dust collector. As above stated the preferred bed temperature is in the range of 1600–1800° F. Control of bed temperature in the chlorinator takes on added importance because this variable, along with feed gas composition, determines the $\phi$ ratio $$\frac{CO}{CO + CO_2}$$

of the chlorinator off-gas. At a given production rate, an increase in the ratio of $O_2/CO_2$ in the feed gas will increase bed temperature which will increase the $\phi$ ratio $$\frac{CO}{CO + CO_2}$$

at the expense of the additional oxygen and coke requirements. A broad working range of $\phi$ in accordance with the invention is about 0.3–0.6, the preferred range being about 0.4–0.5. For obtaining this operation approximately one part by weight of coke is fed to the chlorinator for every three parts by weight of ore, with the ore-coke feed rates appropriately adjusted in accordance with the available feed rate of the recycle chlorine-containing gas for essentially complete utilization of the available chlorine in accordance with the above Equations 1–3, inc. On this basis of operation the non-condensible gases in the chlorinator output line 18 analyze normally and typically as follows by volume of the total non-condensibles:

TABLE II

| | Typical | Normal range | Limits |
|---|---|---|---|
| CO, percent | 43.9 | 40-50 | 30-60 |
| $CO_2$, percent | 53.7 | 60-50 | 70-34 |
| $N_2$, percent | 2.4 | 1-3 | 0-6 |

For separating the gaseous and solid fractions of the chlorinator output, the discharge line 18 connects to a cyclonic dust collector 19, the solids fraction of which comprising principally coke, titanium dioxide and higher melting metallic chlorides, is discharged via line 19a, while the gaseous fraction is discharged over line 20 at about 1500° F., and is fed thence into the base of a furnace condenser 21. The temperature of gases in the dust collector should be at least 800–900° F. to prevent condensation of ferric chloride and other metallic chlorides which might otherwise clog the ductwork in condenser 21 and subsequent equipment as described below.

In condenser 21 the hot entering gases pass through a bed of stacked Raschig rings. Crude $TiCl_4$ at about 80° F. is circulated over the packing countercurrent to the gas flow, thus cooling and condensing the bulk of the $TiCl_4$ vapors, thus to condense about 90% of the $TiCl_4$ vapors to crude liquid $TiCl_4$. This crude liquid is drawn off from the base of the condenser over line 22, while the saturated $CO_2$, CO, $N_2$, and HCl gases thus separated together with the residual uncondensed $TiCl_4$ vapors pass out of the top of the condenser over line 23.

Line 23 extends to the base of a refrigerated condenser 24 which condenses the remaining approximately 10% of previously uncondensed $TiCl_4$ vapors, to the liquid state which is drawn off from the base of the condenser over line 25 and fed to a crude tank hereinafter described, while the $CO_2$, CO, $N_2$, HCl and possible residual $Cl_2$ gases thus separated, pass out of the top of the condenser over line 26 and into the base of a water scrubbing tower 27.

In condenser 24, the residual $TiCl_4$ vapors are condensed by countercurrent direct contact with refrigerated $TiCl_4$ slurry to about $-5°$ F., while the off-gases exit over line 26 at about 0° F. These off-gases enter the water scrub tower 27 with traces of $TiCl_4$ vapors wherein they are scrubbed with water in a packed tower, wherein the $TiCl_4$ is hydrolyzed thus $$TiCl_4 + 2H_2O \rightarrow 4HCl + TiO_2$$

The water scrubber removes most of the HCl from the entering gases, but in order to remove residual amounts thereof, the gases exiting from the top of the scrubber over line 28, are fed into the base of a caustic scrubbing tower 29, wherein the gases are given a final scrubbing in an aqueous solution to which about 8% sodium hydroxide has been added to remove the possible residual chlorine. The gases exiting from the top of tower 29 over line 30, analyze about 44% CO, 54% $CO_2$ and 2% $N_2$.

Interposed in line 30 is a compressor 31 which compresses part of the gases in line 30 and feeds them into the base of a monoethanolamine absorber 32, which absorbs the $CO_2$ gases and thus separates them from the CO-containing gases which pass out of the top of the absorber over a pipeline 33. The monoethanolamine solution of the absorbed $CO_2$ gases is fed from the base of the absorber into the top of a stripper 34, which strips the $CO_2$ gases which pass from the top of the stripper via pipeline 35. The CO and $CO_2$ gases thus separated are dried and utilized in subsequent stages of the process as hereinafter explained. Before so doing, however, the purification processing of the crude $TiCl_4$ fed from the base of the furnace condenser 21 over line 22 and from the base of the refrigerated condenser over line 25 will first be explained.

The function of the purification processing is to remove essentially all of the impurities from the crude $TiCl_4$ that are detrimental to pigment quality. The impurities removed during purification are solids, unreacted coke and ore; high temperature boiling chlorides, mainly iron chloride and vanadium oxychloride; and the low temperature boiling chlorides of silicon and tin. This is accomplished by treating the crude $TiCl_4$ with white mineral oil and separating the impurities from the $TiCl_4$ in two distillation steps.

The crude liquid $TiCl_4$ fed over line 22 contains about 3.5% solids as above enumerated, to remove which the contents of line 22 are first fed into a crude tank 40, into which is concurrently fed over a pipeline 41, a treatment reagent comprising a white mineral oil in the proportions of about 600 pounds of the crude $TiCl_4$ to 1 pound of the oil and the contents of line 25. From the crude tank 40, the liquid crude $TiCl_4$ is fed over a line 42 into a crude feed tank 43. From the crude feed tank 43 the liquid crude $TiCl_4$ is fed over a pipeline 44 into a steam-heated still 45, in which the liquid $TiCl_4$ boils off at about 275° F. In this still the vanadium oxychloride which has a boiling point close to that of $TiCl_4$, reacts with the white mineral oil and any $TiCl_3$ present in the solids to form a higher boiling vanadium compound which does not distill with the $TiCl_4$. The latter as it distills off is fed via pipeline 46 into a condenser 47 wherein it is recondensed to the liquid state, and fed thence into a final steam-heated still 48.

Under normal operating conditions the liquid $TiCl_4$ will be virtually free of any vanadium fractions. However if for any untoward reason the vanadium fraction is higher than is permissible a small amount of fish oil, i.e. one part fish oil to 5000 parts liquid $TiCl_4$ may be added at the final still 48 to insure removal of the vanadium fraction to acceptable levels. The liquid $TiCl_4$ is again redistilled in the final still 48, the pure $TiCl_4$ distillate passing off over line 49 to a condenser 50 for recondensation to the liquid state and delivery thence in purified liquid state into a container 51. Meantime the liquid slurry remaining in the crude still 45, is delivered via pipeline 52 into a bottoms tank 53, from whence it is fed over line 54 to a continuous drier unit 55.

The vapors evolved from the continuous drier are fed over a line 56 to a condenser 57, and thence in liquid state over line 59 back into the final still 48 for redistillation therein and recovery of residual $TiCl_4$ present. The solids fraction from the continuous drier is delivered into a solids collection tank 59a, over line 60a. Also the solids fraction from the duct collector 19 is delivered over line 19a into the solids collection tank 59a. The contents of the solids collection tank which is discharged to waste over line 61, contains by weight about 60% C, 5% $TiO_2$, and 20% chlorides of Fe, V, Cr and Al.

The purified liquid $TiCl_4$ collected in tank 51, is delivered thence over pipeline 65 to a feed tank 66, from whence it is fed over pipeline 67 to a vaporizer 68 for vaporizing the same, the vapors from which are fed thence to a superheater 69 for heating the same to temperature of about 700° F., and fed thence over line 70 to a burner 71 of the type shown in enlarged sectional detail in FIG. 2 as hereinafter discussed. Still referring to the flow sheet, into this burner is also fed the purified CO gas of supply line 33. In addition pure oxygen supplied from a suitable source over a supply line 72, is fed through a preheater 73 for heating the same to about 700° F. and thence over line 74 to burner 71. It is to be noted that there is no admixing of the hot $O_2$ and $TiCl_4$ gases before feeding into the burner 71, but that these gases are separately fed thereinto as is also the CO gas. In the burner 71 as described more in detail below with reference to FIG. 2, the $TiCl_4$ gas reacts with part of the oxygen to form the $TiO_2$ solids pigment and the aforesaid reaction gases by virtue of the heat of combustion obtained by burning the CO gas with additional oxygen to produce $CO_2$ gas.

From the base of burner unit 71, the aforesaid mixture of $TiO_2$ pigment and chlorine-containing gases are fed via pipeline 75 into the base of a bag filter 76, of the construction shown in enlarged detail in FIG. 4, wherein separation is effected between the pigment and gases in the manner hereinafter described more in detail with reference thereto. The burner off-gases freed of the pigment pass out of the top of the bag filter over pipeline 77, and are fed thence into the base of a gas cooling tower 78, wherein the gases are cooled by means of cold sulphuric acid supplied to the top of the cooling tower over pipeline 79. Heat removal from the gas is accomplished by direct contact cooling with recirculated sulphuric acid (about 93%) fed through the tower countercurrent to the upward direction of gas flow. The gas is thus cooled to temperature of about 110° F. The heated sulphuric acid resulting from the heat exchange within the tower, is fed from its base via line 80, and through a cooling coil 81 for recycling in the cold state.

The cooled gas passes from the top of the cooling tower over a pipeline 82 to a junction 83 at which point the burner off-gas flows into a closed constant pressure loop or gas recycle wherein the gas is fed to a cold gas blower 84 where it is compressed from about $-1$ p.s.i. $(g)$ to about $+3$ p.s.i. $(g)$. It is fed thence over a pipeline 85 to a further junction 86 wherein it is divided into several streams, one of which is fed over branchline 86a and tangentially injected into the combustion chamber 106 of the burner unit 71, to provide a vortex scavenging gas flow as above mentioned and as described more in detail below. Another portion is fed over a branchline 86b into the cooling chamber 107 of the burner unit to provide the cooling action discussed above and below for completing the pigment reaction without particle agglomeration. A third portion is fed over a branchline 86c which connects to the pipeline 75 which conveys the hot pigment-burdened gases from the burner unit 71 to the bag filter 76. These gases are discharged from the cooling chamber 107 at about 1500° F., which temperature would be highly injurious to the bag filter which cannot safely handle gases above about 950° F. and preferably not over about 800° F. Hence to reduce the temperature of the gases entering the bag filter to this level, the pipeline 75 is water-cooled and the gas flow therein further cooled by diluting the hot burner off-gases with the cooled recycled gases fed over branchline 86c.

From the various cooling scavenging points the gases return ultimately to the pipeline 75 and thence via the bag filter 76 and pipeline 77 to the blower 84, thus completing the gas recycle; and from thence the burner off-gases flow to a recycle gas compressor 90, wherein they are compressed from about $-1$ p.s.i. $(g)$ to about $+20$ p.s.i. $(g)$ and fed thence over pipeline 91, to the chlorinator. The recycle gas being fed over line 91 to the chlorinator contains by volume of the total about 40–70% $Cl_2$, 15–35% $CO_2$ and 3–20% $O_2$. The chlorine content of the recycle gas comprises about 93% of the total $Cl_2$ required for operation of the chlorinator. Hence the remaining 7% must be supplied from fresh make-up $Cl_2$ and this may be done at blend station 92. Almost invariably the burner off-gases will contain sufficient $O_2$ and $CO_2$ for optimum operation of the chlorinator. However, if for any untoward reason there is a deficiency of either $O_2$ or $CO_2$ these can be added also at blend station 92.

In order to improve the tinting properties of the pigment formed in the burner unit 71, it is desirable that it contain a small quantity of aluminum oxide ($Al_2O_3$ formed therewith. This may be accomplished by admixing a small amount of aluminum chloride $AlCl_3$ with the hot $TiCl_4$ vapors injected into the burner unit 71 over line 70. To this end aluminum and chlorine are fed over lines 94 and 95 into an aluminum choride generator 96 from which the aluminum chloride generated is fed over line 97 to line 70 for admixture with the hot $TiCl_4$ vapors fed into the burner unit 71.

The preferred embodiment of the aluminum chloride generator 96 and method of generating $AlCl_3$ for use in the process, is to produce it in a fluidized bed which consists mainly of alumina particles. The fluidized bed is fluidized with chlorine or nitrogen, or a combination of these two fluids, in order to meet the following two criteria.

The bed must, at all times, be maintained fluidized and, as such, a minimum gas velocity is required. Secondly, as titanium tetrachloride is required for the burner, an appropriate quantity of chlorine is metered into the generator 96 to give just the required amount of $AlCl_3$. These two criteria set the quantity of nitrogen and chlorine to be fed at any time.

Aluminum powder is fed to the bed over line 94 in order to keep, at all times, a small quantity of aluminum in the bed, say between 1% and 8% of the bed weight. If the aluminum content gets too high, the bed will solidify and, if it gets depleted, the reaction will take place above the bed.

The pigment separated from the burner gases in the bag filter 76 falls by gravity into a screw feeder 99, which delivers the same into a pulp tank 100, which is also supplied with water. Caustic and dispersant agents may be added at this point to improve the flow properties of the slurry. The pulp tank discharges over line 102, into a slurry collection tank 103, from whence the slurry is piped over line 104 to conventional pigment-finishing processing.

Referring now to FIGS. 2 and 3, the burner unit 71 of FIG. 1b, comprises a burner assembly 105, a combustion chamber 106 and cooling chamber 107. The burner comprises three concentric tubes consisting of an inner tube 110 for the injection of heated $TiCl_4$ gas, a middle tube 111 of somewhat larger diameter for the injection of oxygen, and an outer tube 112 of still larger diameter for the injection of carbon monoxide gas. These tubes have connected thereto respectively in the manner shown, supply line connections as at 113, 114, 115.

The tubes terminate substantially flush with one another at their lower ends within a hollow cap 116 having a circular opening 117 therein. The lower end of the burner assembly 105, projects into the upper end of the combustion chamber 106 as shown. This chamber comprises a cylindrical tubular member 118, provided with a flanged upper end on which is seated a cover plate 120 bolted thereto, as at 121, and which snugly surrounds the outer burner tube 112.

Inlet pipes for the tangential injection of shrouding oxygen gas at ambient temperature, extend tangentially through the wall of member 118 at substantially the base of the cap 116, as at 122, 123, being spaced equally thereabout. Also at a slight distance below the cap, the housing 118 is tangentially pierced as at 124, by additional inlet pipes, as at 125, FIGS. 2 and 3, for providing vortex scavenging gas injection, as described above and below. Member 118 is jacketed as at 126, 127, above and below the vortex injection piping, for circulation of a coolant liquid, such as cold water, introduced and withdrawn as at 128, 129 and 130, 131, respectively.

The combustion chamber may also be provided with a mechanical scraper for removing pigment particles adhering to the wall member 118. This may take the form of a metal ring 131a which fits inside the inner wall of member 118, and which is reciprocable axially of this member, by actuating arms as at 131b, secured thereto and which extend upwardly through suitable sliding fit apertures on the cover plate 120. As pointed out above the O.D. of the scraper ring may be varied to provide $TiO_2$ deposits of various thickness on the wall of member 118 pursuant to optimum gas velocities and heat transfer through the walls of member 118.

The cooling chamber 107 comprises a tapering tubular member 132, of decreasing diameter from top to base, the upper end of which is joined to the flanged base 133 of the combustion chamber member 118. Member 132 is likewise jacketed, as at 134, for circulation of a coolant liquid, such as water, introduced and withdrawn as at 135, 136. The lower end of member 132 is pierced by a series of radially extending injection nozzles, as at 137, 138, for injecting cooling gas as explained below; while the upper end is also pierced for the same purpose by injection nozzles, as at 140, 141, which may pierce the member 132 radially or alternatively tangentially as in FIG. 3.

In a successfully operative embodiment of a burner unit in accordance with the FIGS. 2 and 3 showing, the burner tubes 110–112, inc., have inner diameters (I.D.) of 2.51", 3.76" and 4.63" (i.e. inches) respectively. The cap 116 has an opening diameter of 2.75". The combustion chamber 106 is 8.5" I.D. x 42" long. The quench chamber 107 is 16" I.D. at the top x 11.25" I.D. at the base x 4'10" in length.

Referring to FIG. 4, the bag filter 76 is a modification of that described in Patent Re. 24,954, but operating on essentially the same principles and hence will be described only to the extent of the modification and as employed in the present invention for separating the pigment from the pigment-burdened off-gases discharged over line 75 from the burner unit 71, FIGS. 1b and 2. To this end the bag filter 76 comprises a vertically disposed housing enclosure 150 of cylindrical or other desired shape, provided with a top closure portion 151 and having a trough-shaped base 152 which opens into the screw discharge feeder 99. The burner off-gas discharge line 75 of FIG. 1b extends to the tapered base of the bag filter and opens thereinto as at 153, FIG. 4, for delivering the pigment-burdened off-gases into the base of the housing interior, from wherein these gases, after separation of the pigment therefrom, are discharged via the off-gas discharge line 77 penetrating the upper portion of the housing in the manner shown in FIG. 4.

For providing the filtering action, the housing interior is spanned by a partition 154, spaced below the top 151 and of sufficient thickness to provide support for a plurality of banks of filter screens one of such banks being described below. To this end the partition 154 essentially divides the enclosure 150 into upper and lower chambers, as at 155, 156, respectively. The lower portion 156 is adapted to accommodate a plurality of banks of cylindrical filter screens suspended substantially vertically therefrom and to this end the partition 154 is provided with a series of openings in which are tapped a series of venturi-tubes, as at 157, only one of which is shown in axial section. To the underside of the partition 154 and in axial alignment with the corresponding bank of venturi tubes 157, are secured a corresponding series of woven wire mesh tubular filters, as at 158. These filters are made of a heat- and corrosion-resisting metal, such as "Inconel" of composition 80% Ni, 5% Fe and 15% Cr. Extending substantially horizontally into the upper chamber 155 is a pulse tube for each bank of filters the inner extremity of each pulse tube being closed. Located axially along the pulse tube 159 on the underside thereof, are a series of apertures, as at 160, all of which are connected by their respective pulse tube, such as 159, to the $CO_2$ gas pressure line 35. The apertures 160 are disposed, respectively, in axial alignment with the venturi tubes 157 of their respective bank of filters, the apertures being of smaller diameter than their respective filter venturis 157. Located at the lead-in end of each pulse tube 159 is a solenoid-actuated diaphragm valve, as at 161. These valves are adapted to be actuated automatically one at a time in rotative sequence by timer circuit connections in a manner well known in the art and hence requiring no detailed description.

Operation of the bag filter is as follows: The pigment-burdened gases from the burner injected into the base of the housing 150–152, inc., via pipeline 75 and opening 153, flow thence upwardly between and around the tubular filters 158, through which the gases pass to the interiors of the filter tubes, while the pigment solids are retained on the exterior thereof to provide the filtering action. The thus-filtered gases flow thence through the filter venturi tubes 157 into the upper chamber 155 and thence out through the off-gas discharge line 77. Meantime pulses of high pressure $CO_2$ gas are periodically and sequentially injected into the pulse tubes 159, by successive actuation of the corresponding valves 161. These pulses of high pressure $CO_2$ gas pass downwardly through the restricted apertures 160 of the corresponding pulse tubes and thence through the aligned filter venturi tubes 157, and thence into and through the corresponding tubular filters 158, in direction opposite to the flow of filtered burner gases therethrough, thus to dislodge pigment particles adhering to the filter exteriors. The pigment particles, as thus dislodged, fall by gravity into the funnel base and pass thence into the screw feeder conveyor for discharge into the pulp tank 100, FIG. 1b.

The pulses of $CO_2$ gas are adjusted to be of extremely short duration of the order of $\frac{1}{10}$ second or less and at high pressure of the order of 100 p.s.i. or more. With such brief high pressure blasts injected sequentially from the apertures 160 of the pulse tubes 157, the pigment particles are dislodged from the filter exteriors without interrupting the flow of burner gases through the filtering system. This action is further facilitated by the restricted apertures of the pulse tubes injecting the $CO_2$ gas directly into the filter venturis which produces momentary suction on the filter gas stream thus avoiding back-pressure effects in the pulse tubes.

Reverting now to FIGS. 1b, 2 and 3 for explanation of the operation of the burner unit in its various aspects, the basic operation is that of feeding the hot $TiCl_4$ and oxygen gases into the combustion chamber via the inner and middle burner tubes 110 and 111 respectively while concurrently feeding the carbon monoxide gas through the outer tube 112. Immediately after these gases pass through the cap opening 117, ignition occurs and is maintained by combustion of the CO gas with part of the oxygen. The flow of the gases is so regulated, as explained below, that the combustion temperature is preferably maintained within the range of about 2400–3600° F. within the combustion chamber 106. At such temperature the $TiCl_4$ vapors react with the oxygen gas to form particles of the $TiO_2$ pigment with release of chlorine in gaseous form, while the carbon monoxide gas is burned by the oxygen supply to carbon dioxide. The pigment solids-burdened gases flow thence down through the cooling chamber 107 and thence out through the discharge pipe 75.

Meantime shrouding oxygen or free oxygen-containing gas is injected through pipes 122, 123, while the cooled burner off-gases supplied over pipelines 85, 86a, FIG. 1b, are injected through the tangential vortex pipes 125 for providing the cooled inert burner off-gas scouring or cleansing protective sheath above discussed for preventing adherence of the pigment particles to the combustion chamber inner wall. Cooled burner off-gas fed over lines 85, 86b, is also injected into the cooling chamber via either the lower inlet pipes 137, 138, or the upper inlet pipes 140, 141, or both as operating conditions may require to provide the cooling action above discussed. Instead of employing the cooled burner off-gases for the above applications, cooled $CO_2$ from the supply line 35, FIG. 1b, may be used, or a mixture of this gas with other gases inert to the burner operation may be employed such as $Cl_2$ or $O_2$.

In the operation of the burner unit of FIGS. 2 and 3 for the production of a high quality, rutile titanium pigment of excellent particle size, $TiCl_4$ gas at about 700–800° F. is injected into the burner pipe 110, while oxygen at this same temperature or higher in some cases is injected through burner pipe 111, and carbon monoxide gas at ambient temperature is injected through burner pipe 112. The $TiCl_4$ gas is introduced at the rate of about 1584 lbs./hr. at about 1–5 p.s.i.; the oxygen at the rate of about 72 standard cubic feet minute (s.c.f.m.) and at temperature of about 700–900° F.; and the carbon monoxide at the rate of about 33 s.c.f.m. at ambient temperature. Shrouding oxygen gas at ambient temperature is introduced through pipes 122, 123, at the rate of 5–20, preferably 16 s.c.f.m. Recycle burner off-gas at 100° F. is introduced through the vortex nozzles 125 at the rate of 20–80 s.c.f.m. at ambient temperature. For the cooling chamber, cooling gas is introduced at about 100° F. through the upper injection nozzles 140, 141, at the rate of about 100 s.c.f.m. and through the lower injection nozzles 137, 138, at about 200 s.c.f.m. Referring to FIG. 1b sufficient $AlCl_3$ vapor is mixed into the $TiCl_4$ vapor at 700° F. to yield from about 1.5 to 2.5% by weight $Al_2O_3$ in the $TiO_2$ pigment form.

The carbon monoxide gas introduced into the burner pipe 112 of FIG. 2 must contain a small amount of $H_2O$, i.e., about 1% by volume or a small amount of another combustible auxiliary hydrogen-containing gas such as $H_2$, $CH_4$, $C_3H_8$ which combusts with $O_2$ to produce $H_2O$, i.e., about 1%, preferably ½% by volume or slightly less, in order to stabilize the flame. The shrouding oxygen injected through pipes 122, 123, is employed to keep the burner tip clean and free from deposits of any titanium dioxide that may recirculate within the combustion chamber. The operation temperature in the combustion chamber 106 of FIG. 2 is as above stated preferably maintained at about 2400–3800° F. under the operating conditions above stated, while that in the cooling chamber 107 is preferably maintained at about 1300–2100° F. for purposes above explained. The temperature in the discharge duct 75 which connects to the base of the quench chamber, is at about 1100–1700° F. but is cooled down to about 800° F. before entering the bag filter as above explained.

Reverting to FIG. 2, the relative feed rates of $TiCl_4$, oxygen and carbon monoxide gases supplied to burner tubes 110, 111 and 112 must be so adjusted as to provide a sufficient amount of oxygen to react stoichiometrically with all of the $TiCl_4$ plus a sufficient amount to react stoichiometrically with all of the carbon monoxide and to convert all of the CO to $CO_2$, plus a sufficient excess of $O_2$ to yield about 3–20% and preferably about 10–15% of free $O_2$ in the burner product gases. Also the amount of CO gas introduced must be such as to maintain a temperature in the reaction zone of the reaction chamber 106 of about 2400–3800° F., and a $CO:TiCl_4$ mol ratio within the range of about 0.25–1.0, and preferably about 0.5–0.6. With the burner feed rates thus adjusted, the reaction product gases discharged with the pigment through the discharge duct 75 and after separation of the pigment in the bag filter 76 and with the addition of the $CO_2$ gas introduced through the bag filter pulsing tubes, consist essentially of $Cl_2$, $O_2$ and $CO_2$.

As previously explained, a portion of this gas mixture after cooling to ambient temperature in the cooling tower 78, is recycled over lines 91, 16, into the chlorinator 15 along with make-up chlorine supplied over line 93, therein to react with the titanium-bearing raw material and the carbonaceous reductant to produce a gaseous mixture evolved over line 18 consisting essentially of $TiCl_4$ vapors plus CO and $CO_2$ gases, the amount of CO gas being from 30 to 60% by volume of the total gases after removal of the $TiCl_4$ and solids as hereinbefore described. The purified mixture of CO plus $CO_2$ gases ultimately delivered over line 30 to the absorber 32 for removal of $CO_2$ gas is so separated into CO and $CO_2$ constituents by the absorber and stripper so that the CO gas delivered over line 33 to the burner 71, contains not more than 20% of $CO_2$ gas by volume of the total. By thus utilizing the carbon monoxide gas produced in the chlorinator 15 for use in the burner 71, the need for an independent CO gas generator, such has heretofore been generally required in prior art processes, is eliminated, although such may be employed in the present process if desired.

Thus the invention provides, as one feature thereof, an integrated cyclic process for producing titanium pigment from a titanium-bearing raw material, such as a rutile ore, wherein the titanium values of the raw material are first converted to $TiCl_4$ by chlorination in the presence of a solid carbonaceous reductant, such as coke, to produce a mixture of $TiCl_4$, CO and $CO_2$ gases, the constituents of which are separated and purified, and wherein the purified CO gas thus obtained is burned with oxygen in the burner to provide the requisite heat for reacting the preheated $TiCl_4$ gas with oxygen to form the pigment, and wherein the chlorine-containing product gases from the burner are recycled to the chlorinator to react with additional titanium-bearing ore or equivalent to produce additional $TiCl_4$ and CO gas in a continuous, recycling operation. The following example is illustrative of a practical embodiment of this overall recycling process.

EXAMPLE

Referring to FIGS. 1 and 2, 1386 lbs./hr. of vaporized $TiCl_4$ were injected through the inner orifice 110 of burner 105, while 5000 cu. ft./hr. of $O_2$ were injected through the intermediate orifice 111, and 1330 cu. ft./hr. of CO were injected through the outer orifice 112. These amounts of gases are equivalent to the stoichiometric amounts of $O_2$ required to react with all of the $TiCl_4$ to form $TiO_2$ and with the CO to form $CO_2$, the latter to provide the requisite auxiliary heat, plus a sufficient excess of $O_2$ to produce an exit gas containing about 17% of $O_2$. The CO and $O_2$ gases upon reacting provided sufficient heat to cause the reaction between the $TiCl_4$ and the $O_2$ gases to occur at temperature of about 2550–3500° F., at which reaction temperature an excellent grade of $TiO_2$ pigment was produced. The pigment-burdened gases formed were cooled rapidly by cooled and recycled product gases fed over line 85 as above explained and thence in part via line 86b into the cooling chamber 107, and in part via line 86c into line 75 leading to the bag filter 76. After separation of the solids content of the pigment-burdened gases in the bag filter, the gas mixture delivered therefrom over the discharge line 77 contained about 53% $Cl_2$, 29% $CO_2$, 14% $O_2$ and 4% $N_2$. This mixture of gases was then recycled via lines 91, 16, into the bottom of a chlorinator 15 at the rate of 10,875 cu. ft./hr. These gases consumed 600 lbs. of titanium material and 200 lbs. of coke per hour. The titanium material used in the chlorinator had the following chemical analysis: 96% $TiO_2$, 1% Fe (total) and 3% other oxides. The chlorination took place at a temperature between 1640 and 1690° F. At this rate of chlorination, $TiCl_4$, $CO_2$ and CO gases were produced respectively at the rate of 1400 lbs., 5345 cu. ft. and 4280 cu. ft./hr. The $TiCl_4$ produced was then condensed in the condensers 21 and 24, and 31% of the evolved mixture of CO and $CO_2$ gases were, after purification, delivered to the separator 32 comprising a monoethanolamine adsorber in which the $CO_2$ gas was absorbed at the rate of 1655 cu. ft./hr., thereby producing a purified CO gas mixture exiting over line 33, analyzing 88% CO, under 1.0% $CO_2$ and the remainder $N_2$, delivered at the rate of 1520 cu. ft./hr. The condensed $TiCl_4$ was purified and vaporized as above explained, and fed back into the burner 71, at the rate it was produced along with the purified CO gas of analysis described above, thus completing the cycle.

In the production of a titanium pigment wherein aluminum chloride is introduced into the burner unit along with titanium tetrachloride for producing a titanium dioxide pigment having aluminum oxide formed therewith, the amount of oxygen fed into the burner unit should be in excess, so that the exit gases will contain about 3–20% free oxygen over and above the stoichiometric amount required not only to react with all of the $TiCl_4$ and CO present to produce $TiO_2$ and $CO_2$, respectively, but also to react with all of the aluminum chloride to form the oxide $Al_2O_3$. The following is an illustrative example of such production in accordance with the invention:

EXAMPLE

Using a three-component concentric type burner as in FIG. 2, 1584 lbs. per hour of vaporized $TiCl_4$ containing 1.5% vaporized $AlCl_3$ were added through the inner orifice, while 4800 cu. ft. per hour of $O_2$ were added through the intermediate orifice and 1980 cu. ft. per hour of CO were added through the outermost orifice. These amounts of gases are equivalent to the stoichiometric amounts of $O_2$ required to react with all of the $TiCl_4$ and $AlCl_3$ to form $TiO_2$ and $Al_2O_3$ respectively; and with all of the CO to form an auxiliary heat source and $CO_2$, plus a sufficient excess of $O_2$ to produce an exit gas containing 17% of $O_2$. The auxiliary heat produced provided a temperature within the reaction zone within the range of about 2500–3800° F. which was sufficient to cause the vaporous $TiCl_4$ and vaporous $AlCl_3$ to react with $O_2$ and form the corresponding oxides with small amounts of the unreacted chlorides in the product gases. It has been found that the reaction of $TiCl_4$ and $AlCl_3$ with $O_2$ takes place substantially immediately within this temperature range.

The $TiO_2$ burdened gases including the unreacted chlorides were passed from the reaction zone at the rate of 860 cu. ft. per minute at 2820° F. into a cylindrical cooling chamber, 7.2 cu. ft. in size, along with 155 cu. ft. per minute of previously cooled solids-free product gases, at 100° F. These cooled gases lowered the temperature of the $TiO_2$ burdened gases from 2820° F. to 1760° F. substantially immediately. The cooled $TiO_2$ burdened gases were then retained in the cooling chamber for an average of 0.32 second during which time conversion of the unreacted titanium and aluminum chlorides to oxides took place.

The cooled $TiO_2$ burdened gases issued from the cooling chamber at the rate of 1340 cu. ft./min. at 1760° F. and were mixed with 360 cu. ft./min. of additional cooled recycled gas which lowered the temperature of the $TiO_2$ burdened gases to 752° F.

After cooling the $TiO_2$ burdened gases to 752° F., the suspended $TiO_2$ was then removed from the gases by passing the latter through a filter separator.

99.9% of $TiO_2$ values were recovered as $TiO_2$ pigment while over 90% of the aluminum values were recovered as $Al_2O_3$ on the pigment.

In order to demonstrate the effectiveness of the process of the instant invention, a run was made for comparison using the procedure described above, except that no controlled cooling technique was employed. In this run only 98.7% of the $TiO_2$ was recovered and only 70% of the aluminum values were converted to $Al_2O_3$ on the pigment as a consequence of which measurable amounts of unreacted chlorides of titanium and aluminum were found in various parts of the cooling system where they presented a potential for malfunctioning of the equipment.

The conversion of the unreacted titanium and aluminum chloride values may be facilitated in another way by the addition, following the cooling step, of sufficient $H_2O$ to react with these chlorides to produce the corresponding oxides and HCl. To this end at least the stoichiometric amount of $H_2O$ and preferably $H_2O$ in excess of this amount should be introduced into a portion of the cooling zone wherein the temperature has been reduced to at least 1300° F. in order to prevent reaction between the $H_2O$ and the chlorine of the product gases. The following is an example of this procedure:

EXAMPLE

Using a three-component concentric type burner, 990 lbs. per hour of vaporized $TiCl_4$ containing 1.5% $AlCl_3$ were added through the central orifice while 3350 cu. ft. per hour of $O_2$ were added through the intermediate orifice and 1235 cu. ft. per hour of CO were added through the outermost orifice. These amounts of gases were equivalent to the stoichiometric amounts of $O_2$ to react with all of the $TiCl_4$ to form $TiO_2$ and to form $CO_2$ with all of the CO added, plus sufficient excess to form 11.0% oxygen in the exit gases. The $CO–O_2$ gases formed sufficient heat to permit the reaction between the $TiCl_4$ and the $O_2$ to take place at a temperature between 2550° F. and 3300° F. The pigment-burdened reaction gases formed were cooled immediately to 1100° F. by adding to the reaction gases 400 cu. ft./min. of previously cooled substantially dry product gases which had been treated or freed of their solids burden and cooled to a temperature of 72° F. To this end the reaction gases and the cooled recycled gases were admixed in a cylindrical chamber having a volume of 7.2 cu. ft. The cooled gas mixture was then analyzed for $TiCl_4$ and $AlCl_3$ and were found to contain 0.064% $TiCl_4$ and 0.037% AlCl₃. These amounts of unreacted chlorides are equal to 1% of the TiCl₄ and 25% of the AlCl₃ added to the burner.

After the reaction gases had been cooled to 750° F., 0.6 cu. ft./min. of H₂O vapor were added to the cooled gas mixture in order to react with the amounts of unreacted TiCl₄ and AlCl₃ present in the gas mixture, the amount of H₂O vapor added being equivalent to the stoichiometric amount plus a 5% excess.

After treatment with the water vapor, an analysis of the gas mixture gave zero percent unreacted TiCl₄; while the unreacted AlCl₃ was found to have been reduced to about 5.0%.

In order to demonstrate the effectiveness of the process of the instant invention, a run was made for comparison, using the procedure described above, except that no water vapor was added following the cooling of the gases. In this run about 1.0% unreacted TiCl₄ and up to 30% unreacted AlCl₃ were present in the gas mixture.

Referring to FIG. 1b an alternative procedure to that above described for handling the pigment-burdened product gases discharged from the burner unit over line 75, is simply to pass the same through a water quenching tower in a closed system thus to form a water slurry of the pigment discharged from the base of the tower into the pulp tank 100. In this way the pigment is automatically separated from the burner off-gases which pass out of the top of the tower over a discharge line. This method of separation, however, produces a higher chlorine loss than does separation in accordance with the FIG. 1b flow sheet, because some of the H₂O in the water separation tower reacts with Cl₂ of the burner off-gases at a sufficiently high temperature to form HCl. The chlorine loss of this wet process is thus about 4–6% as compared to only about 1–2% for the dry process of the flow sheet.

In the wet process the product off-gases are recycled in the same manner as in the FIGS. 1a and 1b flow sheet.

What is claimed is:

1. A continuous process for producing titanium dioxide pigment from titanium-bearing raw materials, such as titanium ores, titaniferous concentrates and the like, which comprises: continuously reacting said raw material with chlorine-containing gas in the presence of a carbonaceous reductant at elevated temperature to produce titanium tetrachloride in gaseous phase in admixture with carbon monoxide- and carbon dioxide-containing gases, cooling said gaseous admixture to condense said chloride, separating said condensed chloride from the remaining gaseous mixture, purifying said chloride and purifying said gaseous mixture substantially to remove constituents therefrom other than carbon monoxide and carbon dioxide, separating a preponderant proportion of said carbon monoxide from said carbon dioxide, continuously reacting said purified chloride in vaporized state, in a closed reaction chamber with a free oxygen-containing gas at elevated temperature maintained by burning said carbon monoxide with a portion of said oxygen to form titanium dioxide particles and chlorine-containing gas, continuously discharging the reaction products from said reaction chamber and separating the solids content from said chlorine-containing gas, and recycling the solids-free chlorine-containing gas for reaction with additional said reductant and titanium raw material, the feed rates of said titanium bearing raw material and of said carbonaceous material being adjusted in accordance with the recycle feed rate of said chlorine-containing gas for essentially complete utilization of the available chlorine content of said gas.

2. The process of claim 1 wherein: said raw material is reacted with chlorine-containing gas in the presence of a solid carbonaceous reductant at elevated temperature of about 1600–1800° F.; said carbon monoxide is separated from said carbon dioxide to produce purified carbon monoxide containing not more than a minor proportion by volume carbon dioxide; said titanium tetrachloride is continuously fed in vaporized and preheated state into said closed reaction chamber together with said purified carbon monoxide and preheated oxygen-containing gas; said elevated temperature maintained by burning said carbon monoxide is about 2400–3800° F.; said free oxygen-containing gas is fed to said chamber in excess of the stoichiometric amount required completely to react with all of said chloride and carbon monoxide fed therein; and said reaction products are cooled after discharge from said reaction chamber.

3. The process according to claim 2 wherein said excess of oxygen supplied to said reaction chamber exceeds said stoichiometric amount by an amount sufficient to form an exit gas containing from 3–20% oxygen.

4. The process according to claim 2 wherein the proportions of said carbonaceous reductant and said titanium-bearing raw material and the excess of oxygen supplied to said reaction chamber are so adjusted that the ratio of CO/(CO+CO₂) in the off-gases from said reaction vessel is about 0.3–0.6.

5. The process according to claim 2 wherein the proportions of said carbonaceous reductant and said titanium-bearing raw material and said excess of oxygen supplied to said reaction chamber are so adjusted that the non-condensible off-gases from said reaction vessel contain about 40–50% of CO and 60–50% CO₂ by volume of the total.

6. The process of claim 1 wherein: said titaniferous raw material and said carbonaceous reductant are admixed in a heated bed through which said chlorine-containing gas is passed at a rate to maintain a bed temperature of about 1300–2300° F.; said carbon monoxide is separated from said carbon dioxide to produce purified carbon monoxide containing not more than a minor proportion by volume CO₂; said free oxygen-containing gas is fed to said reaction chamber in at least the stoichiometric amount required completely to react with all of said titanium tetrachloride and carbon monoxide; said carbon monoxide is provided in sufficient amount to maintain a reaction temperature of about 2400–3800° F. in said reaction chamber; and said TiO₂ is produced as finely divided solid particles suspended in the gas stream of reacted gases consisting essentially of chlorine, oxygen and carbon dioxide.

7. The process of claim 1 including continuously injecting a cool gas inert to the reaction in said reaction chamber, along the inner wall of said reaction chamber to form a moving sheath of said gas along said wall such as to minimize adherence of said oxide particles to said wall.

8. The process of claim 1 wherein: said reaction chamber is elongated and of cylindrical inner contour; said purified carbon monoxide and purified chloride and a free oxygen-containing gas are continuously injected into one end of said reaction chamber; and said chlorine-containing gas from which said solids are separated is cooled and at least a portion thereof is injected into said reaction chamber at points spaced thereabout and in direction tangential to the cylindrical inner wall thereof, thereby producing a helically moving sheath of said gas against said wall for minimizing adherence of said oxide particles thereto and cleansing said wall thereof.

9. The method of claim 1 for producing titanium dioxide pigment which includes: continuously injecting into a reaction chamber, titanium tetrachloride in vaporized state, a free oxygen-containing gas and carbon monoxide gas, and reacting said gases in a combustion zone thereof at elevated temperature of about 2400–3800° F. maintained by burning said carbon monoxide with a portion of said oxygen to produce titanium dioxide particles and chlorine-containing gas, continuously discharging the oxide-burdened reaction product gases into a cooling zone of said chamber and subjecting to coolant action therein at temperature sufficiently low to prevent agglomeration of said pigment particles while maintaining the temperature sufficiently high and for a period sufficiently long to complete conversion of unreacted residual amounts of said chloride into said oxide, and thereupon further cooling to lower temperature.

10. The method of claim 1 for producing pyrogenic titanium dioxide pigment which includes: reacting titanium tetrachloride with a free oxygen-containing gas at temperature above about 2400° F. to produce pigment-burdened gases, cooling said pigment-burdened gases to temperature below 950° F., and injecting through a metal screen of a mesh to retain the solids content.

11. The method according to claim 10 wherein the substantially pigment free gas passing through said screen is further cooled by direct heat exchange with cold sulphuric acid.

12. The process of claim 8 wherein: said reaction products are continuously discharged from said reaction chamber and cooled below about 950° F.; the solids content of said reaction products is separated from the gas portion thereof; said gas portion thereof is further cooled to about 100° F. and a portion thereof is continuously injected into a cooling zone of said reaction chamber disposed below the combustion zone of said gases therein thereby to cool said oxide-laden reaction product gases sufficiently to prevent grain growth of said oxide particles while maintaining the temperature thereof sufficiently high and for a period sufficiently long to consummate conversion of unreacted residual amounts of said chloride into said oxide, and said temperature is thereupon further reduced sufficiently low to prevent further reaction.

13. The continuous process of claim 1 for producing rutile titanium dioxide pigment of low anatase content which includes: continuously reacting a rutile titanium ore with chlorine-containing gas in the presence of a carbonaceous reductant at elevated temperature of about 1300–2300° F. to produce titanium tetrachloride and carbon monoxide-containing gas, cooling said gas to condense said chloride, separating said condensed chloride from the remaining carbon monoxide-containing gas and purifying said chloride, purifying said carbon monoxide-containing gas to contain a preponderant proportion by volume of carbon monoxide, continuously injecting said purified chloride and also said purified carbon monoxide gas and a free oxygen-containing gas into one end of an elongated reaction chamber and reacting therein at elevated temperature of about 2400–3800° F., maintained by burning said carbon monoxide in said chamber with a portion of said oxygen to form titanium dioxide particles and chlorine-containing gas, continuously discharging the reaction products from said chamber, cooling said reaction products below about 950° F., separating said oxide from said chlorine-containing gas, further cooling a portion of the solids-free gas and continuously injecting said cooled portion into said reaction chamber at a point below the combustion zone of said gases therein thereby to cool said oxide-laden reaction product gases to about 1300–2100° F. and maintaining thereat for a period sufficient to reduce the anatase content to not exceeding about 3% by weight, and thereupon cooling to temperature sufficiently low to prevent further reaction.

14. The method of claim 1 for producing pyrogenic $TiO_2$ pigment by the vapor phase reaction of titanium tetrachloride and oxygen in the presence of an auxiliary heat source which includes: introducing vaporous titanium tetrachloride, aluminum chloride and oxygen into a reaction zone, to form a mixture of said gases, introducing vaporous CO into said reaction zone and reacting said CO with oxygen in said reaction zone to produce said auxiliary heat for maintaining the temperature in said reaction zone above about 2400° F., reacting the mixture of gases in the heated reaction zone to produce product gases containing solid particles of $TiO_2$ with $Al_2O_3$ formed in situ therewith and small amounts of unreacted metal chlorides, exhausting the solids-burdened product gases from said reaction zone, contacting said solids-burdened product gases issuing from said reaction zone with a coolant to cool said $TiO_2$ and said product gases rapidly to a temperature below about 2100° F. but above about 1300° F. to prevent further crystal growth of the solid $TiO_2$ particles in said product gases, maintaining the cooled gases within the temperature range of from 1300° F. to 2100° F. for about 0.1 to 5 seconds to insure conversion of the trace amounts of metal chlorides in said product gases to the corresponding oxides, and then cooling the cooled product gases to a temperature below about 950° F. and separating the solid $TiO_2$ particles from the cooled gases.

15. The process of claim 1 wherein: titanium dioxide-containing material and a solid carbonaceous reductant are reacted with a chlorine-containing gas at a temperature of about 1300–2100° F.; said reaction product discharged from said reaction chamber comprises chlorine-containing gas and solid titanium dioxide pigment particles; said reaction product is cooled and passed through screening of a mesh to separate said gases and retain said pigment particles thereon; and pigment particles adhering to said screen are periodically dislodged with blasts of said carbon dioxide gas.

16. The method of claim 1 for producing titanium dioxide pigment which includes continuously injecting into a combustion chamber separate streams of titanium tetrachloride, a free oxygen-containing gas and carbon monoxide-containing gas containing a small amount of $H_2O$ or a combustible gas producing $H_2O$ on burning, reacting said chloride with oxygen in said chamber at temperature of about 2400–3800° F. maintained by burning said carbon monoxide with a portion of said oxygen to produce titanium dioxide pigment.

17. The process of claim 1 for producing titanium dioxide by the vapor phase oxidation of titanium tetrachloride including the steps of: reacting vaporous $TiCl_4$ and oxygen at a temperature above 2400° F. maintained by burning CO with a portion of the oxygen and in the presence of vaporous $AlCl_3$ to produce solid $TiO_2$ and $Al_2O_3$ being formed in situ with said $TiO_2$, and product gases comprising free chlorine, and small amounts of unreacted $TiCl_4$ and $AlCl_3$, introducing a cooled recycle gas into the $TiO_2$-burdened product gases to cool the latter rapidly to a temperature at least as low as 1300° F. and then introducing water vapor into the cooled product gases to react with said unreacted vaporous $TiCl_4$ and $AlCl_3$ to convert the latter to solid oxides of titanium and aluminum.

18. The process of claim 1 for producing titanium dioxide pigment by the vapor phase oxidation of titanium tetrachloride in a tubular combustion chamber having a mechanically-actuated scraper ring disposed therein in a preselected spaced relation to the inner wall of said combustion chamber about the periphery of said ring, said method including: continuously injecting into one end of said combustion chamber, separate streams of titanium tetrachloride and a free oxygen-containing gas, reacting said chloride with oxygen in said chamber at temperature above about 2400° F. to produce titanium dioxide pigment-burdened gases which are discharged through the opposite end of said chamber, while reciprocating said scraper ring longitudinally of said chamber for removing amounts of said pigment adhering to the inner wall of said chamber which are in excess of the spacing between said inner chamber wall and said scraper ring, thereby establishing a thermally insulating layer of said pigment adhering to said chamber wall, having a thickness substantially equal to said spacing for controlling in accordance with the thickness of said layer, the dissipation of heat through said layer and chamber wall.

19. The process of claim 1 wherein: the reaction products discharged from said reaction chamber are discharged into an enclosed water-quenching tower to form a water slurry of titanium dioxide pigment and to separate the chlorine-containing gas therefrom.

References Cited
UNITED STATES PATENTS

| | | | |
|---|---|---|---|
| 1,967,235 | 7/1934 | Ferkel | 23—202 |
| 2,177,068 | 10/1939 | Hutchinson | 23—2 |
| 2,347,496 | 4/1944 | Muskat et al. | 23—202X |
| 2,394,633 | 2/1946 | Pechukas et al. | 23—202 |
| 2,486,912 | 11/1949 | Belchetz | 23—87 |
| 2,488,439 | 11/1949 | Schaumann I | 23—202 |
| 2,519,284 | 8/1950 | Ray et al. | 23—204 |
| 2,559,638 | 7/1951 | Krchma et al. | 23—202 |
| 2,592,762 | 4/1952 | Taylor et al. | 23—2 |
| 2,593,232 | 4/1952 | Watson | 23—204 |
| 2,635,946 | 4/1953 | Weber et al. | 23—202X |
| 2,657,979 | 11/1953 | Saladin et al. I | 23—202 |
| 2,682,930 | 7/1954 | Krchma I | 23—87X |
| 2,701,180 | 2/1955 | Krchma II | 23—87 |
| 2,790,703 | 4/1957 | Frey | 23—87 |
| 2,792,077 | 5/1957 | Mas et al. II | 23—87 |
| 2,805,921 | 9/1957 | Schaumann II | 23—202 |
| 2,815,091 | 12/1957 | Mas et al. I | 23—87 |
| 2,823,982 | 2/1958 | Saladin et al. II | 23—202 |
| 2,915,367 | 12/1959 | Olson et al. | 23—202 |
| 2,928,724 | 3/1960 | Mason et al. | 23—87 |
| 2,980,509 | 4/1961 | Frey | 23—202 |
| 2,985,507 | 5/1961 | Wienert | 23—87 |
| 3,069,282 | 12/1962 | Allen | 23—202X |
| 3,118,732 | 1/1964 | Richards et al. | 23—202 |
| 3,120,427 | 2/1964 | Mas et al. III | 23—202 |
| 3,203,763 | 8/1965 | Kruse | 23—202 |
| 3,224,215 | 12/1965 | Bramekamp et al. | 23—202X |
| 3,253,889 | 5/1966 | Wildt et al. | 23—202 |
| 3,283,476 | 11/1966 | Honigh | 23—219 |
| 3,284,159 | 11/1966 | Kruse | 23—202 |
| 3,340,008 | 9/1967 | Nelson et al. | 23—202 |
| 2,815,091 | 12/1957 | Mas et al. I | 23—87X |
| 3,310,377 | 3/1967 | Stern et al. | 23—202 |
| 3,365,274 | 1/1968 | Carpenter et al. | 23—202 |
| 3,391,998 | 7/1968 | Groves et al. | 23—202 |

EDWARD STERN, Primary Examiner

U.S. Cl. X.R.

23—87; 106—300